P. J. Ayres,
Tire Upsetter.
No. 100,488. Patented Mar. 8, 1870.

Witnesses:
Alex T. Roberts
Geo. T. Brooks

Inventor:
P. J. Ayres
Per Munn & Co.
Attorneys.

United States Patent Office.

PARLEY J. AYRES, OF LYDON, NEW YORK.

Letters Patent No. 100,488, dated March 8, 1870.

IMPROVED TIRE-UPSETTING MACHINE.

The Schedule referred to in these Letters Patent and making part of the same.

*To all whom it may concern:*

Be it known that I, PARLEY J. AYRES, of Lydon, in the county of Lewis, and State of New York, have invented a new and improved Tire-Upsetting Machine; and I do hereby declare that the following is a full, clear, and exact description thereof, which will enable others skilled in the art to make and use the same, reference being had to the accompanying drawings forming part of this specification.

This invention relates to improvements in machines for upsetting tire and metal bars, and has for its object to provide a simple, efficient apparatus especially adapted for readily applying and removing the tires.

The invention comprises a main bed of cast metal, with a vertical fixed pillar, a sliding bed with another pillar, a pair of clamping dogs, a pair of supporting links for the pivots of the dogs, and an eccentric operating lever, all arranged as hereinafter more fully specified.

A represents the permanent bed; and

Figure 1:
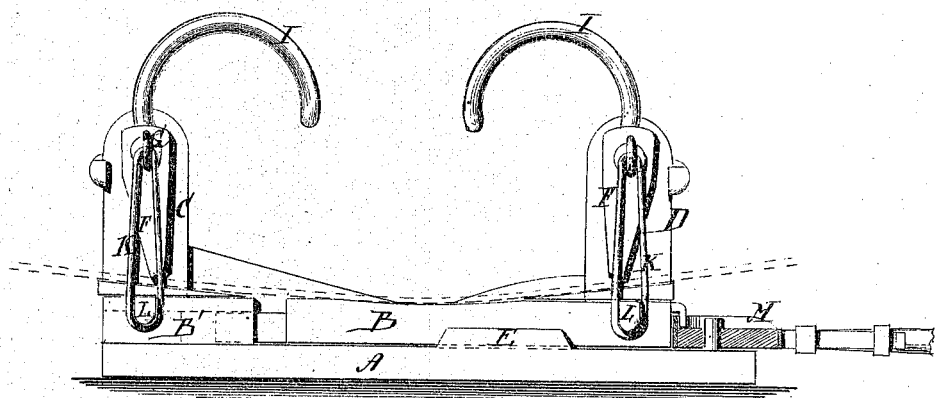
Figure 1 represents a side elevation of my improved machine.
Figure 2:
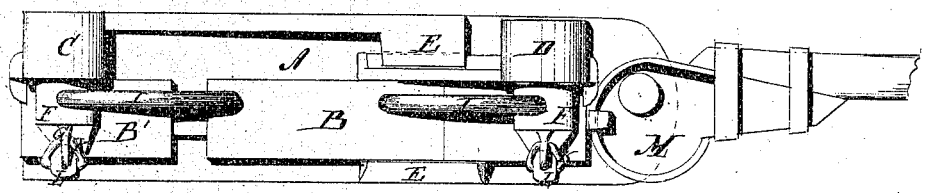
Figure 2 represents a plan view of the same.

B, the sliding bed.

C represents the pillar of the permanent bed; and

D, the pillar of the sliding bed.

The latter is provided with suitable side guides E fixed to the permanent bed, and at the end where the pillar C is placed, an elevation, B', is raised, similar in size and cross-section to the sliding bed, but hollowed for a reduced part of the latter to slide under.

Each pillar is provided with a pawl or jaw, F, suspended from pivot bolts at the top of the pillars, so that their lower ends reach nearly to the upper surfaces of the bed B, and the elevation B', respectively.

Under these jaws the parts B B' are stacked and serrated, or steel wedges may be placed under them with serrated faces.

The jaws F have curved levers L rising above them, and bent inward, so as to have a tendency to throw the points outward. These handles serve also for raising the jaws when the bar is to be inserted.

K represents links connected to the pivot bolts, and arranged to engage at the lower ends with the lugs L to support the pivot bolts under strain.

M represents the eccentric lever for forcing up the slide B.

For operation this slide is drawn back, the links disengaged, the pins raised, and the heated tire or bar placed under the jaws; they are then allowed to fall down to engage the tire. The links are then hooked under the lugs, and the machine is ready for operation by working the lever to force the part B toward the part B', which may be done several times at one heat of the tire, the eccentric being arranged to draw the part B back, which the jaws permit being shaped and arranged to hold the bar firmly when the part B is thrown inward, but to be drawn along the bar readily when moved the other way.

Having thus described my invention,

I claim as new and desire to secure by Letters Patent—

The combination of the permanent bed A B', movable bed B, jaws F, bent handles I, pillars C D', bolt G, links K, projections L, and operating eccentric lever M, all substantially as specified.

P. J. AYRES.

Witnesses:
CHAS. BRITTON,
JOHN PYNE CLARK.